US008511693B2

(12) United States Patent
Gass et al.

(10) Patent No.: US 8,511,693 B2
(45) Date of Patent: Aug. 20, 2013

(54) MOBILE BASE FOR A TABLE SAW (75) Inventors: Stephen F. Gass, Wilsonville, OR (US); James F. W. Wright, Sherwood, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 13/589,346

(22) Filed: Aug. 20, 2012

(65) Prior Publication Data

US 2013/0056610 A1   Mar. 7, 2013

Related U.S. Application Data (63) Continuation of application No. 12/317,373, filed on Dec. 22, 2008, now abandoned, and a continuation of application No. 12/380,407, filed on Feb. 27, 2009, now Pat. No. 8,246,059, and a continuation of application No. 13/136,949, filed on Aug. 15, 2011, now Pat. No. 8,266,997, which is a continuation of application No. 11/395,502, filed on Mar. 31, 2006, now abandoned, which is a continuation of application No. 12/454,730, filed on May 20, 2009, now Pat. No. 7,997,176.

(60) Provisional application No. 61/008,696, filed on Dec. 21, 2007, provisional application No. 61/067,620, filed on Feb. 29, 2008, provisional application No. 60/667,485, filed on Mar. 31, 2005.

(51) Int. Cl.
*B62D 33/08* (2006.01)
*B62B 5/00* (2006.01)
*B60B 33/06* (2006.01)

(52) U.S. Cl.
CPC ............... *B62B 5/0083* (2013.01); *B60B 33/06* (2013.01)
USPC .................. 280/43.17; 280/43.14; 280/43.24; 280/79.11

(58) Field of Classification Search
CPC ............................. B62B 5/0083; B60B 33/06
USPC ................ 280/6.15, 35, 43.12, 43.13, 43.14, 280/43.17, 43.24, 6.151, 6.153, 6.154, 6.155, 280/638; 108/20, 21, 22, 144.11, 145, 147, 108/147.22; 312/27, 28, 30, 312, 319.1, 312/319.5, 319.6, 319.7, 319.9, 325; 414/458, 414/459, 540, 546; 248/651, 669
See application file for complete search history.

(56) References Cited

U.S. PATENT DOCUMENTS 723,692 A * 3/1903 Litsey ............................ 280/35
940,565 A  11/1909 Temple
(Continued)

FOREIGN PATENT DOCUMENTS

CA    2294266    12/1998
CA    2332887    12/1999

*Primary Examiner* — J. Allen Shriver, II
*Assistant Examiner* — Jacob Meyer (57) ABSTRACT A mobile base that attaches to the stand of a table saw is disclosed. The mobile base includes wheels and casters that rotate down and lift the saw when a foot pedal is depressed. The mobile base raises the saw asymmetrically to provide clearance for the legs of an extension table attached to the table of the saw. A locking mechanism locks the wheels and casters so that they do not retract while the saw is moved, and a foot-operated lever releases the wheels and casters so that they may retract and lower the saw back to the ground.

11 Claims, 14 Drawing Sheets (56) References Cited

U.S. PATENT DOCUMENTS

| | | | |
|---|---|---|---|
| 1,092,220 A | 4/1914 | Koch et al. | |
| 1,392,387 A | 10/1921 | Wood | |
| 1,990,118 A | 2/1935 | Ellis | |
| 2,042,489 A * | 6/1936 | Williams | 280/43.14 |
| 2,192,337 A | 3/1940 | Tiffany | |
| 2,199,392 A | 5/1940 | Dabrasky | |
| 2,258,819 A | 10/1941 | Sohn | |
| 2,463,381 A | 3/1949 | Hicks | |
| 2,513,440 A | 7/1950 | Alderson | |
| 2,537,909 A * | 1/1951 | Puddester | 188/5 |
| 2,553,939 A | 5/1951 | Pivovaroff | |
| 2,624,590 A * | 1/1953 | Tilton | 280/43.14 |
| 2,628,068 A * | 2/1953 | Sehnert | 254/10 C |
| 2,783,055 A * | 2/1957 | Michaud | 280/43.14 |
| 2,798,729 A | 7/1957 | Paul | |
| 2,812,189 A * | 11/1957 | Geldhof | 280/43.14 |
| 2,843,392 A | 7/1958 | Simpkins | |
| 2,923,373 A | 2/1960 | Ledgerwood | |
| 2,937,850 A * | 5/1960 | Winkler et al. | 254/8 R |
| 2,993,740 A * | 7/1961 | Good | 108/80 |
| 3,215,401 A | 11/1965 | Grabarski | |
| 3,250,513 A | 5/1966 | Fenner et al. | |
| 3,270,574 A | 9/1966 | Stewart et al. | |
| 3,404,884 A | 10/1968 | Sorenson et al. | |
| 3,422,929 A | 1/1969 | Oja et al. | |
| 3,520,547 A | 7/1970 | Anthony | |
| 3,544,127 A * | 12/1970 | Dobson | 280/43.17 |
| 3,733,623 A * | 5/1973 | Croxton | 5/611 |
| 3,801,122 A * | 4/1974 | Shoemaker et al. | 280/43.24 |
| 3,817,546 A * | 6/1974 | Sugiura | 280/43.12 |
| 3,836,162 A | 9/1974 | Felkner | |
| 3,840,210 A | 10/1974 | Hollingsworth | |
| 3,845,933 A * | 11/1974 | Heizer, Jr. | 254/8 R |
| 4,063,616 A * | 12/1977 | Gutierrez | 182/17 |
| 4,068,551 A * | 1/1978 | Kreitz | 83/471.3 |
| 4,269,096 A | 5/1981 | Boone | |
| 4,369,822 A * | 1/1983 | Rice | 144/286.1 |
| 4,489,449 A | 12/1984 | Failor et al. | |
| 4,639,005 A * | 1/1987 | Birkley | 280/43.14 |
| 4,655,466 A | 4/1987 | Hanaoka | |
| 4,723,808 A * | 2/1988 | Hines | 296/20 |
| 4,726,405 A * | 2/1988 | Bassett | 144/287 |
| 4,768,617 A * | 9/1988 | Mason et al. | 182/1 |
| 5,018,930 A | 5/1991 | Hardin et al. | |
| RE34,404 E | 10/1993 | Dupont et al. | |
| 5,299,817 A | 4/1994 | Chang | |
| 5,308,094 A * | 5/1994 | McWhorter et al. | 280/43.17 |
| 5,403,022 A * | 4/1995 | Snider | 280/30 |
| D364,412 S | 11/1995 | Hilliard et al. | |
| 5,464,315 A | 11/1995 | Palmer et al. | |
| 5,482,303 A * | 1/1996 | Meloy | 280/43.17 |
| 5,551,668 A | 9/1996 | Hung | |
| 5,599,031 A | 2/1997 | Hodges | |
| 5,615,451 A * | 4/1997 | Peterson et al. | 16/34 |
| 5,628,522 A * | 5/1997 | Hall | 280/43.17 |
| 5,785,293 A | 7/1998 | Ford et al. | |
| 5,791,434 A * | 8/1998 | Swiderski | 182/17 |
| 5,826,893 A * | 10/1998 | Snoeyenbos | 280/43 |
| 5,876,173 A * | 3/1999 | English, Jr. | 414/458 |
| 5,940,932 A | 8/1999 | LaHay | |
| 5,941,341 A * | 8/1999 | Gillis et al. | 182/17 |
| 5,957,649 A * | 9/1999 | English et al. | 414/458 |
| D415,868 S * | 10/1999 | Hewitt | D34/23 |
| 6,029,585 A | 2/2000 | Tabayashi | |
| 6,079,931 A * | 6/2000 | English et al. | 414/458 |
| 6,095,533 A * | 8/2000 | Balolia | 280/35 |
| 6,109,625 A * | 8/2000 | Hewitt | 280/43.24 |
| 6,179,087 B1 * | 1/2001 | Moffat | 182/15 |
| 6,311,992 B1 * | 11/2001 | Theising | 280/79.11 |
| 6,343,556 B1 | 2/2002 | Lanphear | |
| 6,371,496 B1 | 4/2002 | Balolia | |
| 6,421,854 B1 * | 7/2002 | Heimbrock | 5/610 |
| 6,533,524 B2 * | 3/2003 | English et al. | 414/458 |
| 6,654,998 B1 | 12/2003 | Berdan et al. | |
| 6,659,706 B2 * | 12/2003 | English et al. | 414/458 |
| 6,715,979 B1 * | 4/2004 | Theising et al. | 414/458 |
| 6,782,976 B2 | 8/2004 | Hewitt | |
| 6,837,665 B2 * | 1/2005 | English et al. | 414/458 |
| 6,843,625 B2 * | 1/2005 | Hewitt | 410/66 |
| 6,874,432 B2 | 4/2005 | Lanphear | |
| 6,942,229 B2 | 9/2005 | Brazell et al. | |
| 6,971,656 B2 * | 12/2005 | Lin | 280/79.11 |
| 6,997,466 B2 * | 2/2006 | Wang | 280/43.17 |
| 7,004,454 B2 | 2/2006 | Petrone et al. | |
| 7,077,406 B2 * | 7/2006 | Lin | 280/79.11 |
| 7,112,028 B2 * | 9/2006 | English et al. | 414/458 |
| 7,303,181 B1 | 12/2007 | Nymann | |
| 7,374,184 B2 | 5/2008 | Worthy | |
| 7,584,935 B2 * | 9/2009 | Chen | 248/647 |
| 8,246,059 B2 * | 8/2012 | Gass et al. | 280/43.14 |
| 2002/0043776 A1 * | 4/2002 | Chuang | 280/43.24 |
| 2005/0134011 A1 * | 6/2005 | Lin | 280/43.14 |
| 2005/0173877 A1 * | 8/2005 | Wang | 280/43.17 |
| 2005/0220585 A1 * | 10/2005 | English et al. | 414/458 |
| 2006/0045685 A1 * | 3/2006 | Warner et al. | 414/458 |
| 2006/0103092 A1 * | 5/2006 | Strahler et al. | 280/79.11 |
| 2006/0201300 A1 | 9/2006 | Schwaiger et al. | |
| 2007/0102599 A1 | 5/2007 | Lin | |
| 2008/0056871 A1 * | 3/2008 | Morgan et al. | 414/495 |
| 2008/0066519 A1 | 3/2008 | Potter et al. | |
| 2008/0112782 A1 | 5/2008 | Leahy et al. | |
| 2009/0072117 A1 * | 3/2009 | Gampe | 248/651 |
| 2009/0189135 A1 | 7/2009 | Van Der Westhuizen | |
| 2009/0224133 A1 * | 9/2009 | Gass et al. | 248/651 |
| 2010/0303593 A1 * | 12/2010 | Peacock | 414/458 |

\* cited by examiner

MOBILE BASE FOR A TABLE SAW

CROSS-REFERENCE TO RELATED APPLICATIONS

This application is a continuation of U.S. patent application Ser. No. 12/317,373, filed Dec. 22, 2008 now abandoned and titled "Mobile Base for a Table Saw," which in turn claims the benefit of and priority from U.S. Provisional Patent Application Ser. No. 61/008,696, filed Dec. 21, 2007. This application is also a continuation of U.S. patent application Ser. No. 12/380,407, filed Feb. 27, 2009 and titled "Mobile Base for a Table Saw," issuing as U.S. Pat. No. 8,246,059 on Aug. 21, 2012, which in turn claims the benefit of and priority from U.S. Provisional Patent Application Ser. No. 61/067,620, filed Feb. 29, 2008. This application is also a continuation of U.S. patent application Ser. No. 13/136,949, filed Aug. 15, 2011 now U.S. Pat. No. 8,266,997 and titled "Table Saw Throat Plates and Table Saws Including the Same," which in turn is a continuation of U.S. patent application Ser. No. 12/454,730, filed May 20, 2009, issuing as U.S. Pat. No. 7,997,176 on Aug. 16, 2011, which in turn is a continuation of U.S. patent application Ser. No. 11/395,502, filed Mar. 31, 2006, now abandoned, which in turn claimed the benefit of and priority from U.S. Provisional Patent Application Ser. No. 60/667,485, filed Mar. 31, 2005. The disclosures of all these applications are herein incorporated by reference.

TECHNICAL FIELD

The present disclosure relates to a mobile base that may be attached to a table saw or other piece of power tool equipment.

BACKGROUND

In a workshop environment, such as a wood-working workshop, it is sometimes necessary to move tools from one place to another within the workshop. For example, a tool may have to be moved from a storage location to a position where it can be used and then back to the storage location. Also, a tool may have to be moved in order to clean-up certain areas, or bring new items into the workshop area. This presents a special problem for large, heavy or awkward tools such as table saws.

To address this issue, different kinds of mobile bases have been developed. A mobile base gives a piece of equipment mobility by providing it with wheels that operate when the equipment needs to be moved. Once the equipment is moved to its new location, the wheels may either be withdrawn or prevented from rotating so that the equipment does not move.

This document describes a mobile base designed to attach onto a fixed base, or stand of a power tool.

DETAILED DESCRIPTION

Figure 1:
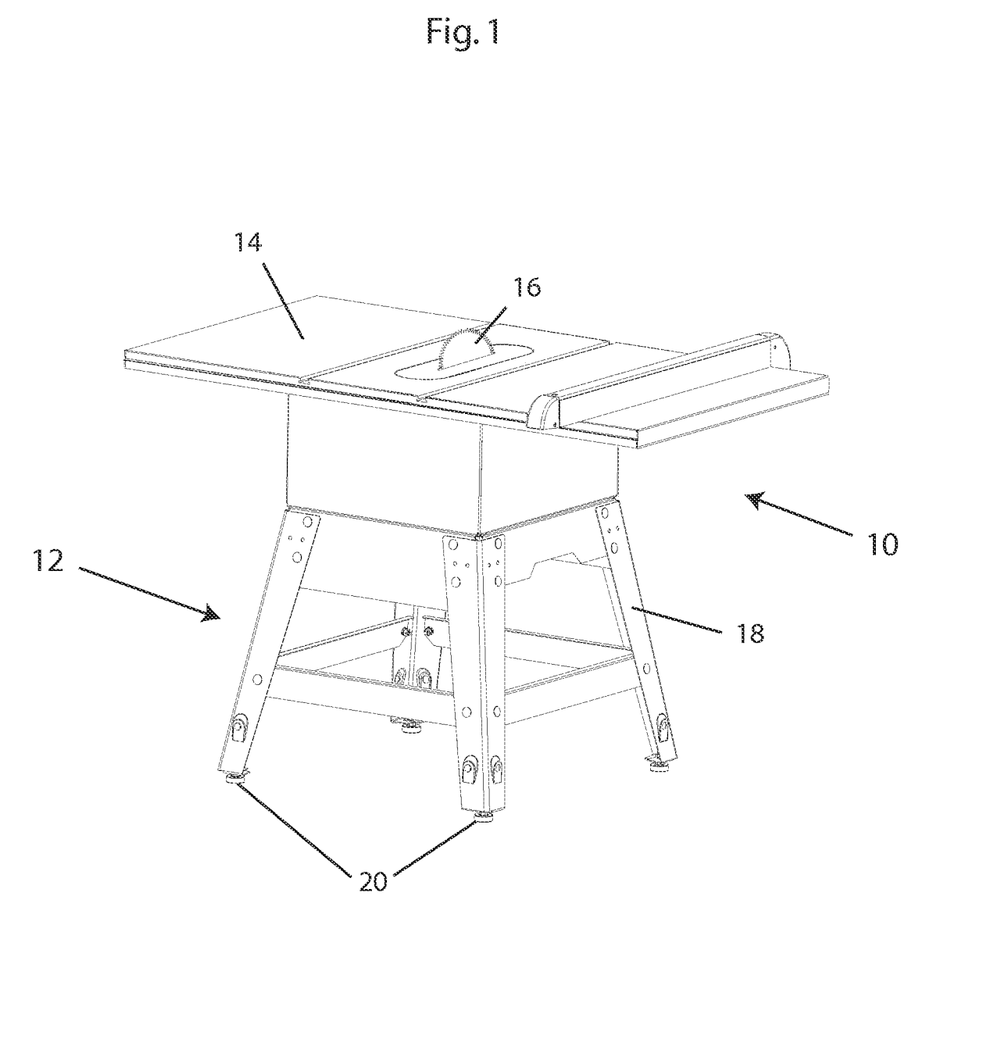
FIG. 1 shows a saw on a fixed base or stand.

A saw 10 secured on a fixed base, or stand 12 is shown in FIG. 1. Saw 10 includes a table 14 and a circular blade 16 that extends up through the table. A piece of wood, or other material to be cut, is placed on the table and pushed into contact with the spinning blade to make a cut.

Saw 10 is a type of table saw called a contractor saw. A contractor saw typically includes an open-leg stand, like stand 12. Stand 12 includes four legs 18, each ending with a foot 20 that rests on the floor or ground to support the saw. A typical contractor saw may weigh from 150-250 pounds or more, depending on its configuration, and table 14 may measure in the neighborhood of 24"×44" or more. Thus, the saw is difficult to move.

Figure 2:
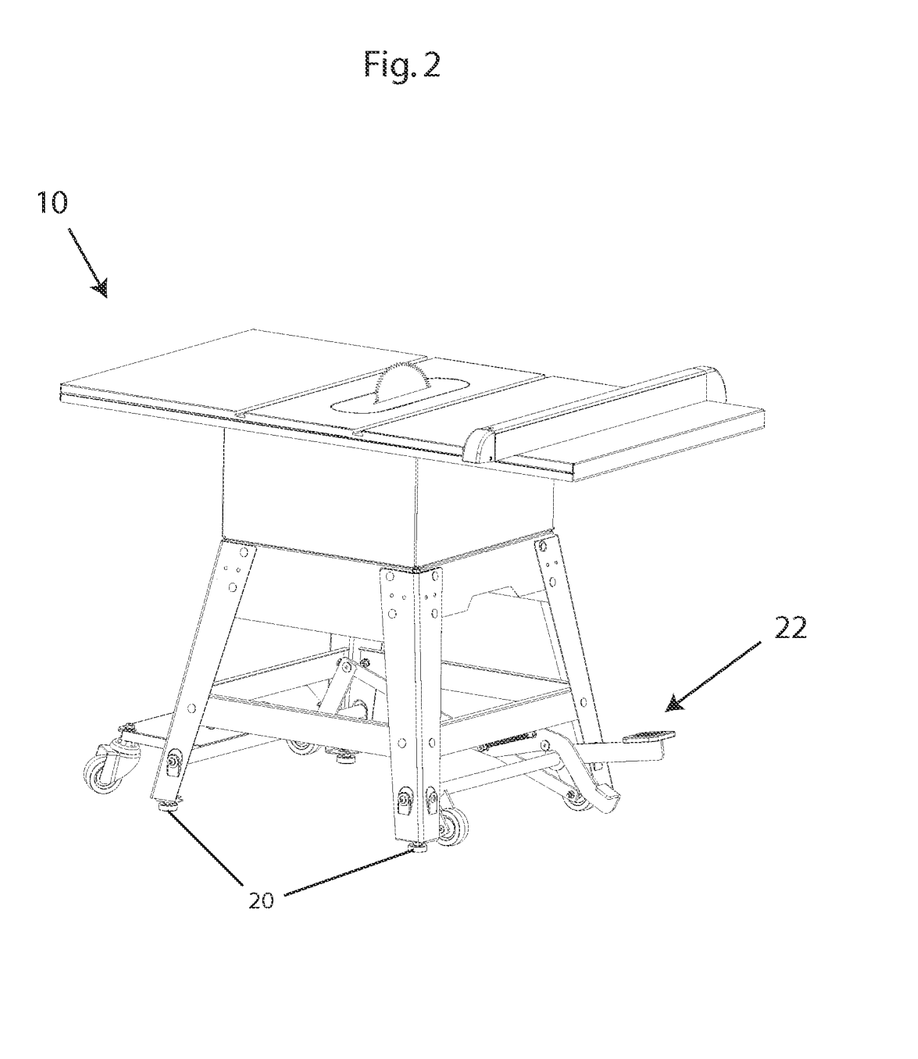
FIG. 2 shows a saw with a mobile base.
Figure 3:
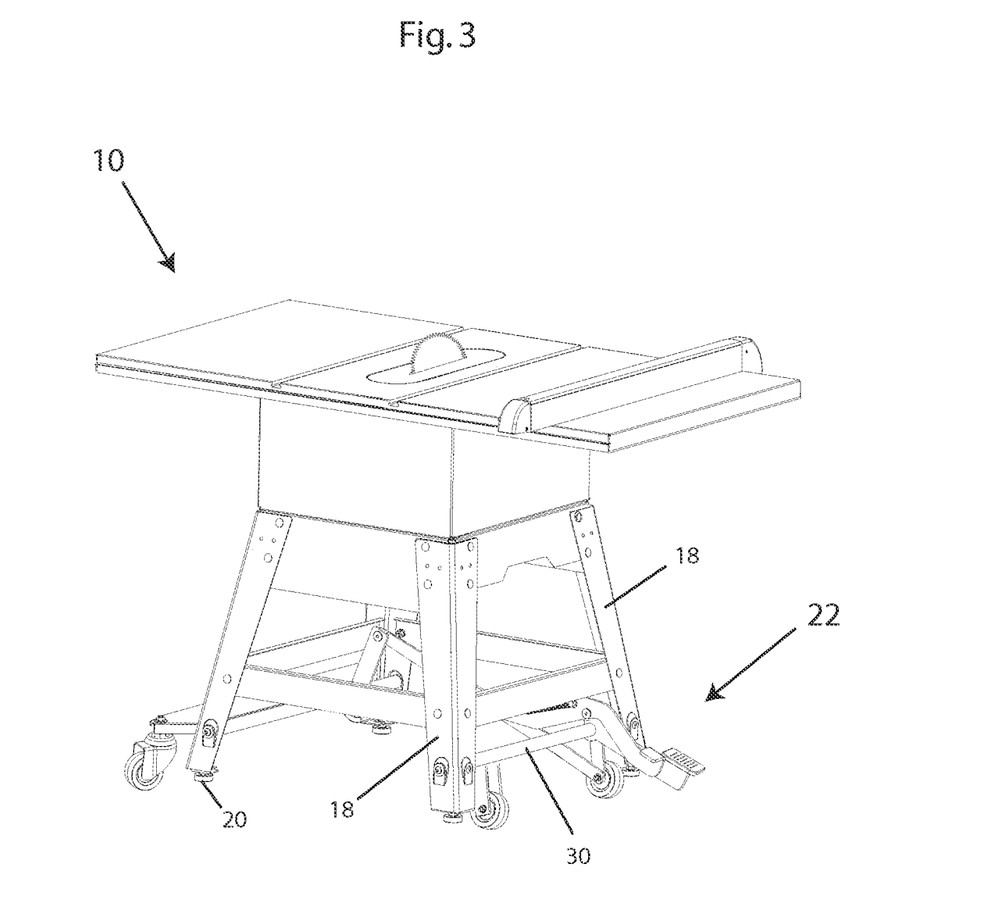
FIG. 3 shows the saw of FIG. 1 up on the wheels of a mobile base.
Figure 4:
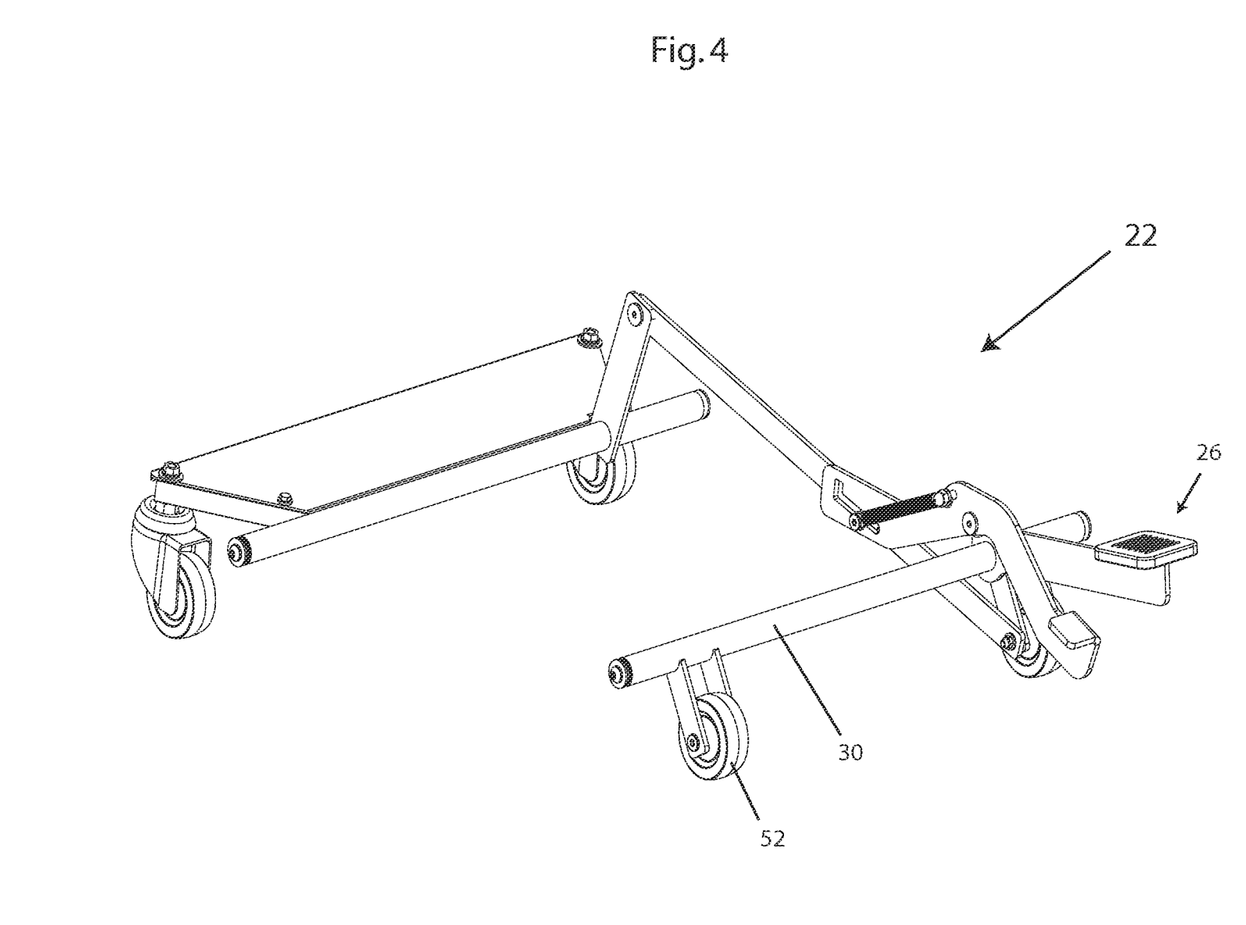
FIG. 4 shows the mobile base of FIG. 2 by itself.

FIG. 2 shows saw 10 equipped with a mobile base 22. The mobile base provides wheels for the saw so that the saw can easily be moved around when the wheels are engaged, or extended underneath the saw. As shown in FIG. 2, however, the wheels are retracted and the saw rests on feet 20. FIG. 3 shows the saw up on the wheels of mobile base 22, ready to be moved, with feet 20 off the floor. FIG. 4 shows mobile base 22 isolated from the rest of the saw, and FIG. 5 shows an exploded view of the mobile base.

Figure 5:
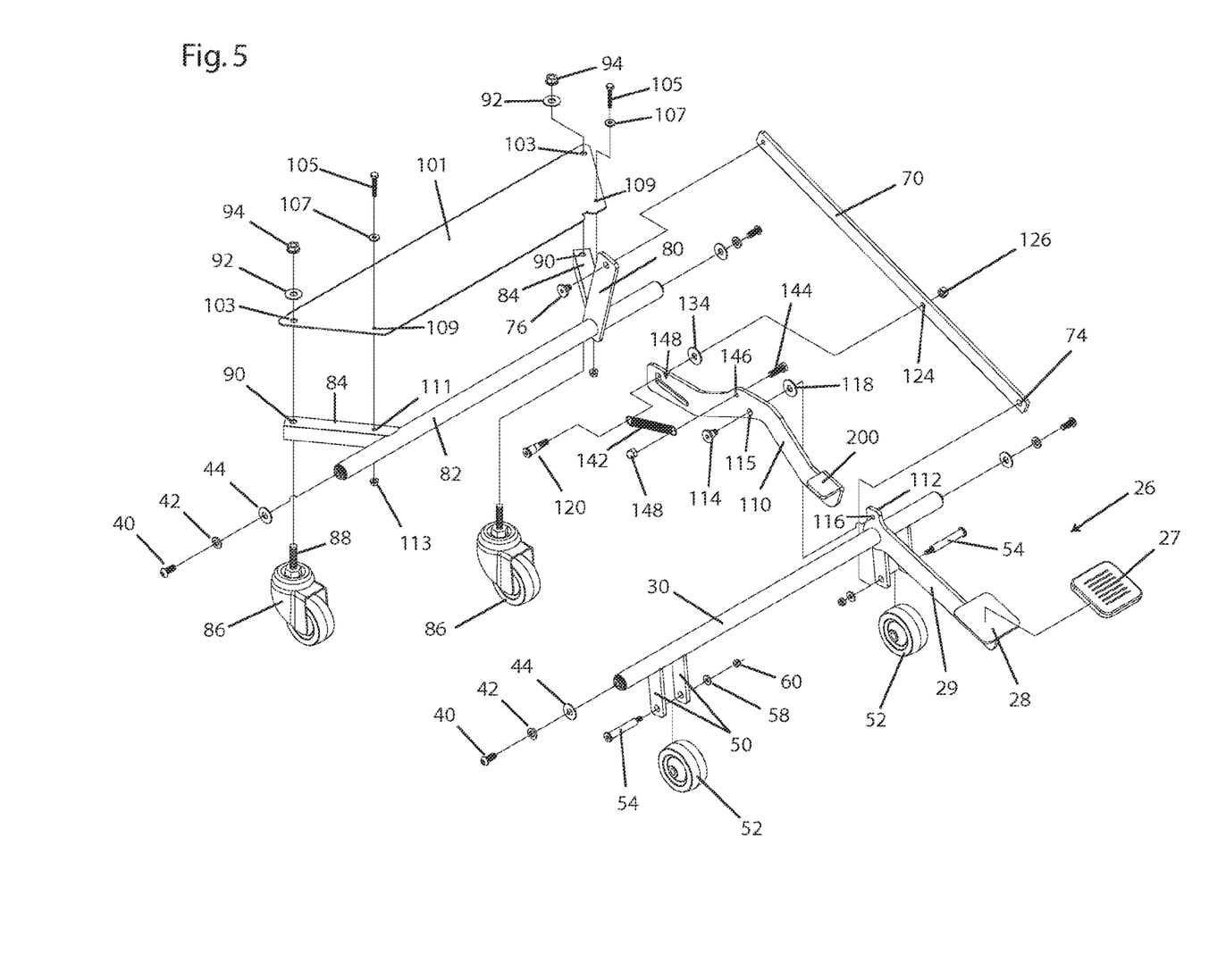
FIG. 5 is an exploded view of the mobile base of FIG. 2.

As shown in FIGS. 4 and 5, mobile base 22 has a foot pedal 26. The foot pedal is designed to lower the wheels of the mobile base under the saw when a person steps on the pedal. The foot pedal is positioned under the saw so that it is easily accessible yet still far enough out of the way to prevent accidental activation of the mobile base.

Figure 6:
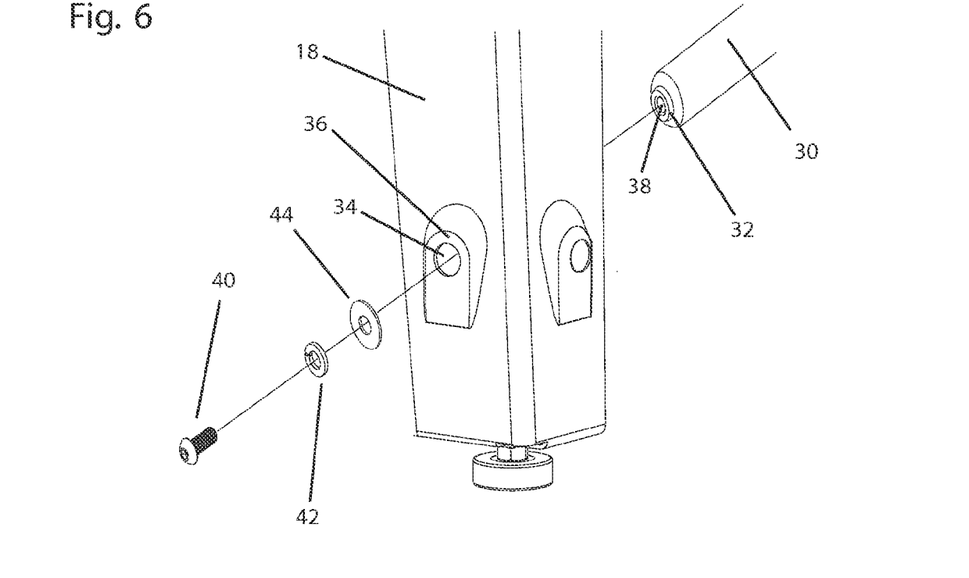
FIG. 6 shows how a bar of the mobile base attaches to a leg of a stand.
Figure 7:
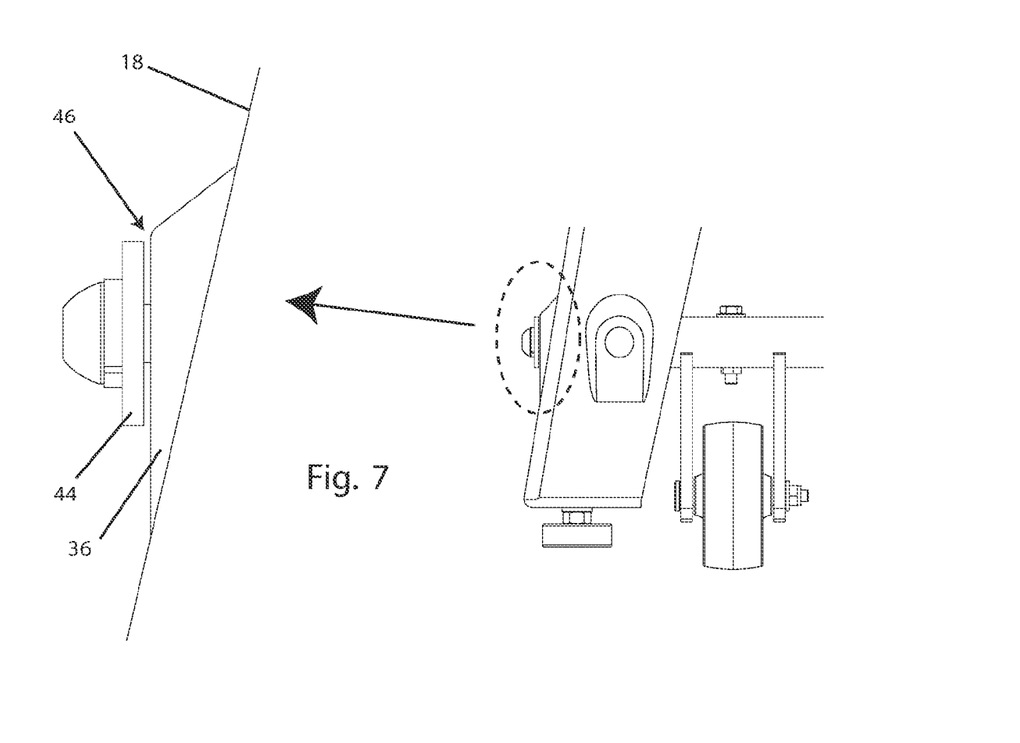
FIG. 7 shows a bar of the mobile base connected to a leg of a stand.

As best shown in FIG. 5, foot pedal 26 includes a rubber friction pad 27 attached to a flat metal plate 28. Plate 28, in turn, is attached to an arm 29 that is welded onto an elongate bar 30. Bar 30 attaches to stand 12 between two legs 18 so that it can rotate around its longitudinal axis. This can be accomplished in different ways. One way is shown in FIGS. 6 and 7. In that example, each end of exemplary bar 30 includes a narrowed projection 32 configured to fit through a corresponding hole 34 in a leg 18 of stand 12 so that projection 32 protrudes slightly beyond the hole. Hole 34 is in a coined surface 36 that extends out from leg 18. Surface 36 is coined outwardly because leg 18 slants, as seen in FIG. 2, and positioning surface 36 outwardly allows the end of the bar to extend through hole 34 while remaining generally horizontal to the ground. Each of the four legs of the stand has two coined surfaces and two holes, allowing the legs to be manufactured identically and be interchangeable, but only one hole from each leg will be used when the mobile base is installed. Bar projection 32 includes a threaded hole 38 and a securing screw 40 is screwed into hole 38 along with a lock washer 42 and a flat washer 44 to hold the bar in place. Projection 32 is sized to leave a gap 46 between washer 44 and the leg of the stand so that the bar may rotate freely while positioned in the hole no matter how tight the securing screw is tightened, as seen in FIG. 7. Lock washer 42 ensures that the securing screw does not come lose by the bar's rotation.

Figure 8:
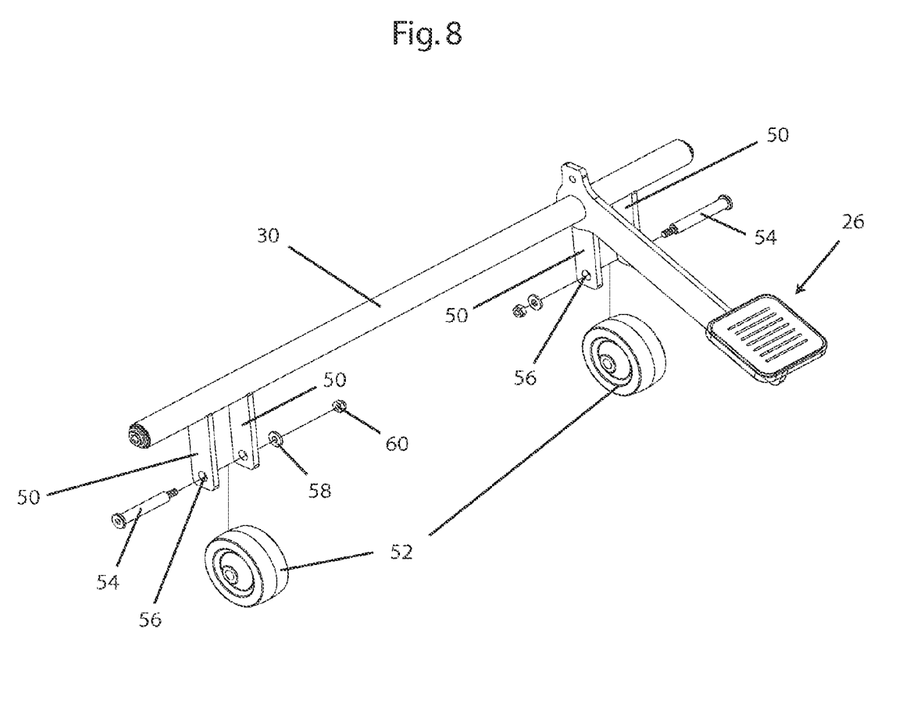
FIG. 8 shows a bar with a foot pedal and wheel mounts welded onto it.

As best seen in FIG. 8, also welded onto bar 30 are four brackets 50. Two brackets are welded to the bar toward one end and the other two are welded to the bar toward the other end. Each set of two brackets constitute a wheel mount. A wheel 52 fits between each set of brackets and an axle 54 extends through each wheel and through holes 56 in the brackets to allow the wheels to rotate and to hold the wheels in place. One end of each axle is threaded and the axle is secured by a washer 58 and a nut 60.

Figure 9:
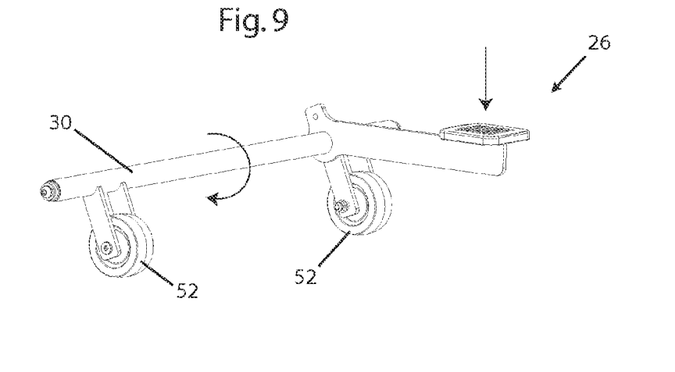
FIG. 9 illustrates how the foot pedal shown in FIG. 8 lowers two wheels.

The assembly of foot pedal 26, bar 30 and wheels 52 is shown in FIG. 9. As foot pedal 26 is pushed downward and bar 30 rotates, the wheel mounts also rotate downward so that the two wheels 52 are lowered to the floor and under the saw.

Figure 10:
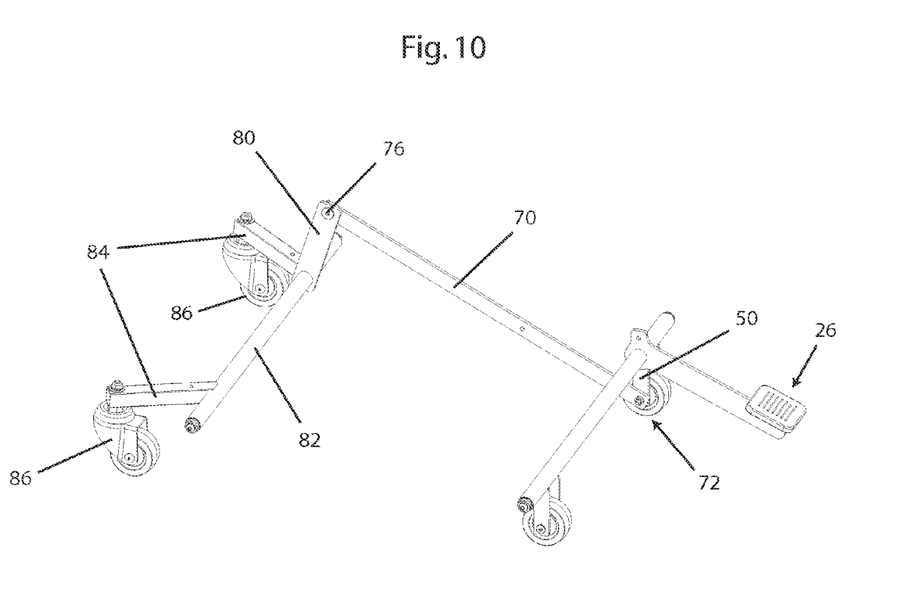
FIG. 10 shows connections between various parts of the mobile base.
Figure 10A:
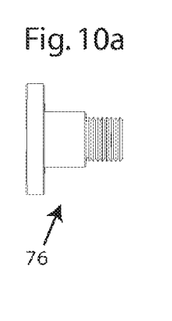
FIG. 10a shows a shoulder screw used in the mobile base.

A rigid elongate link 70 is attached at one end to one of the brackets 50, as shown at 72 in FIG. 10. Link 70 is attached to the bracket by axle 54 extending through a hole 74 in the link. In this manner link 70 can pivot or move around axle 54. The other end of link 70 is pivotally attached to a lever arm 80. One of many possible ways to make a pivotal attachment is to use a shoulder screw. As shown in FIG. 10a, a shoulder screw has a flat section followed by a threaded section. In this example, link 70 is mounted to lever arm 80 about the flat section of a shoulder screw 76 so that it can pivot around the screw. Thread adhesive is used to lock the threads of the shoulder screw in place so that it does not come unscrewed from link 70. Lever arm 80, in turn, is welded to elongate bar 82, and bar 82 attaches to stand 12 between the remaining two legs in the same manner as bar 30 discussed above. Two rigid arms 84 are welded onto bar 82, one toward each end of the bar, and a caster 86 is attached to the free end of each arm. Arms 84 are formed from hollow square metal tubing for strength and a threaded shaft 88 on each caster extends through holes 90 in each arm and is held in place by a washer 92 and a nut 94, as shown in FIG. 5.

Figure 11:
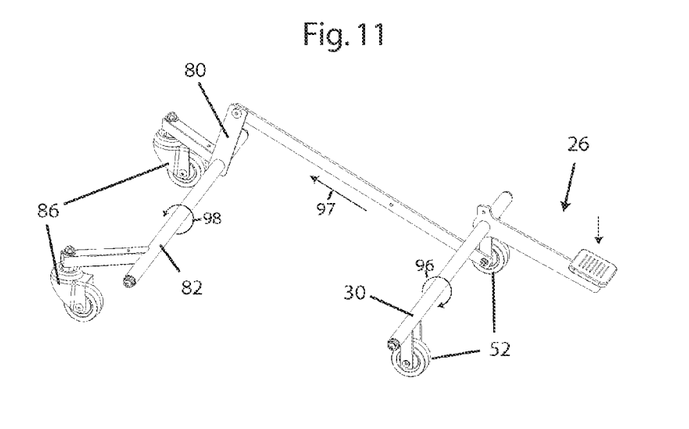
FIG. 11 shows how the foot pedal illustrated in FIG. 8 lowers two casters.

With this configuration, and as depicted in FIG. 11, depressing pedal 26 causes bar 30 to rotate and lower wheels 52. At the same time, rotating bar 30 in the direction indicated by arrow 96 causes link 70 to move in the direction of arrow 97 pushing lever arm 80, which in turn rotates bar 82 in the direction of arrow 98, opposite the rotation of bar 30. That rotation of bar 82 lowers casters 86. Lever arm 80, and arm 50 discussed above, are sized to provide the mechanical advantage needed to lower the wheels and casters and lift the saw. Casters 86 are free to rotate 360 degrees around an axis defined by threaded shaft 88 thus providing more flexible freedom of movement, while wheels 52 are fixed to provide better steering.

Figure 12:
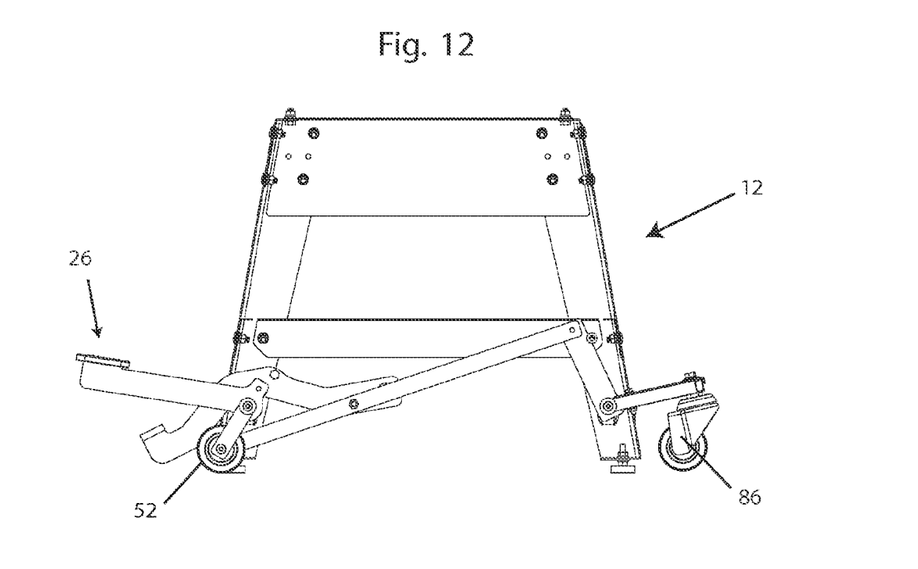
FIG. 12 shows a side view of the mobile base on a stand with the wheels in a retracted, non-operable position.
Figure 13:
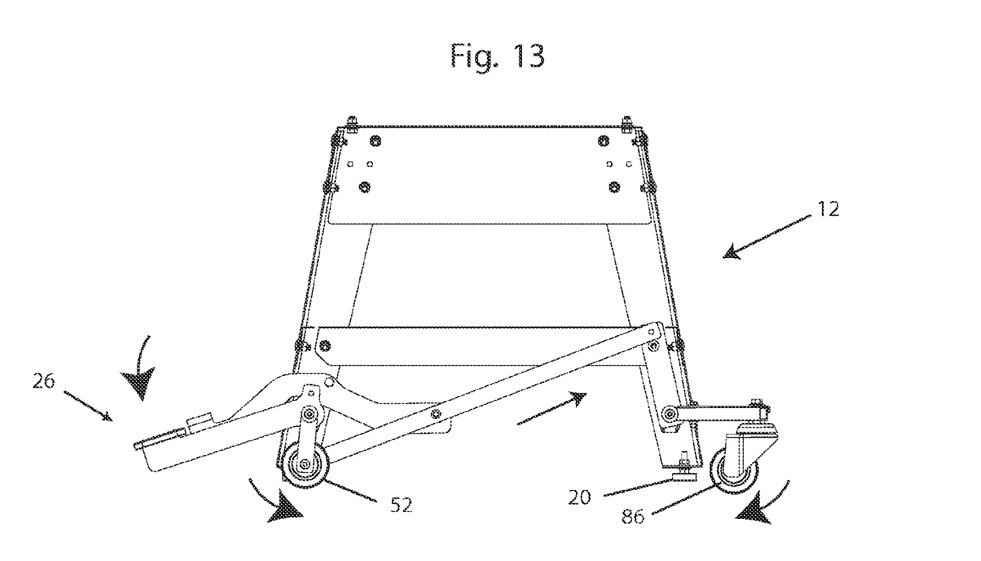
FIG. 13 is similar to FIG. 12, except the wheels are in an extended, operable position.

The extension of the wheels and the lifting of the saw is also shown FIGS. 12 and 13. FIG. 12 shows a cross-sectional view of stand 12 resting on the floor. In this position, pedal 26 is up, wheels 52 rest on the ground alongside the feet of the stand, and casters 86 are raised up off the ground. FIG. 13 shows pedal 26 down, wheels 52 rotated down to pick up one side of the saw, and wheels 86 rotated down to pick up the other side of the saw. In this configuration, feet 20 are off the ground and the saw can be easily moved by rolling it on wheels 52 and casters 86. In an alternative configuration, wheels 52 may be replaced by one wheel, or casters 86 may be replaced by one caster, so that the mobile base includes three wheels instead of four.

Figure 14:
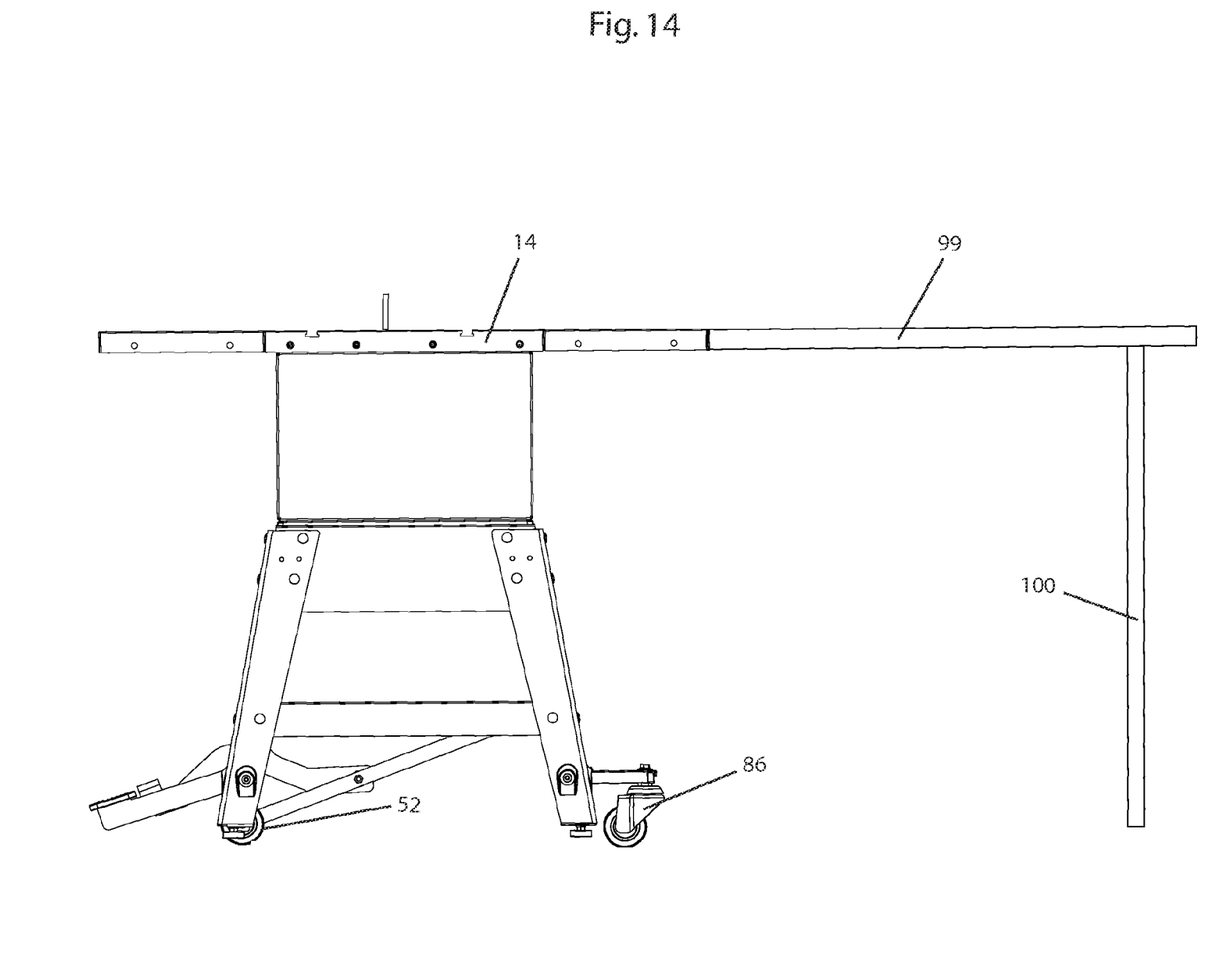
FIG. 14 shows a mobile base supporting a saw with an extension table attached.

As shown in FIG. 14, casters 86 raise the saw higher on their side than wheels 52 do on their own side. Thus the saw is raised asymmetrically at an angle. This provides clearance for legs of an extension table 99 without having to support the legs of the extension table separately. An extension table is an optional attachment to the table top 14 of the saw that provides extra table space for cutting larger workpieces. An extension table attaches to one side of table top 14 in such a way that it extends several feet beyond the casters, as shown in FIG. 14. The far end of an extension table typically is supported by one or more legs, such as leg 100. Raising the saw at an angle provides clearance for legs 100 so that the mobile base can be used to move the saw when an extension table is attached.

Figure 15:
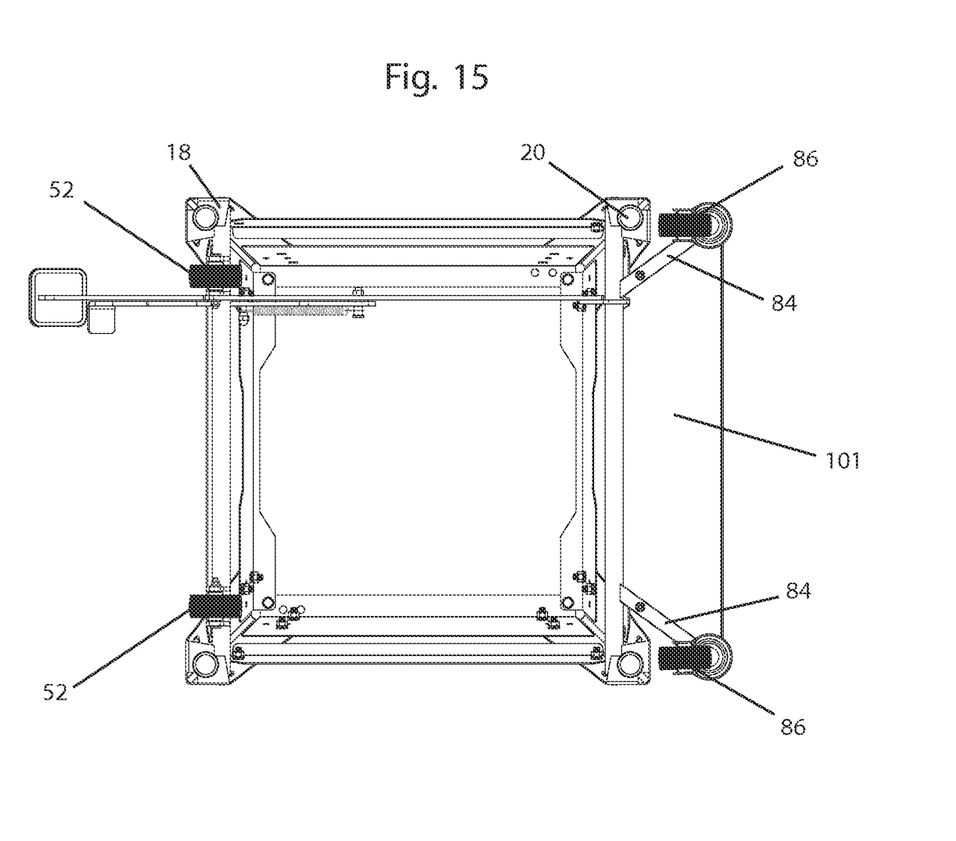
FIG. 15 shows the mobile base attached to the stand of a saw and viewed from underneath.
Figure 16:
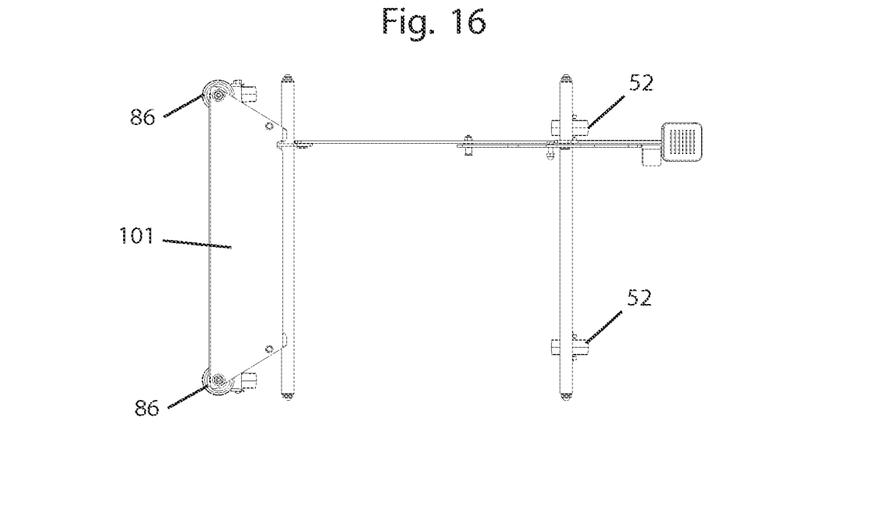
FIG. 16 shows a top view of the mobile base.

To be able to pick up the saw and provide stability when an extension table is attached to the saw, arms 84 hold the two casters out away from the stand toward the legs of the extension table, as shown in FIG. 14. With an extension table, the center of gravity of the saw moves toward the legs of the extension table, and holding the casters out beyond the stand helps insure the center of gravity remains between casters 86 and wheels 52. If the center of gravity was between the casters and extension table legs, then the legs would not be raised off the ground when the casters were lowered. As can better be seen in FIGS. 15 and 16, arms 84 extend outwardly at an angle relative to the stand. Angling arms 84 outwardly allows casters 86 to be held apart as widely as practical to provide increased stability for the saw. A plate 101 extends between arms 84 to add strength to the caster mounts by tying them together and to provide a barrier to keep people and items out of the area between the casters. Plate 101 is attached at both ends of each arm 84 as shown most clearly in FIG. 5. At one end, plate 101 is connected to arm 84 by shaft 88 of caster 86 which passes through hole 90 in arm 84 and then through hole 103 in plate 101 where it is held in place with washer 92 and nut 94. At the other end, plate 101 is connected to arm 84 by a screw 105 that passes through a washer 107 and then through a hole 109 in plate 101 and finally through a hole 111 in arm 84. Screw 105 is secured with nut 113. While casters 86 are positioned outside of stand 12 for increased stability, wheels 52 and bar 30 are positioned substantially inside and in line with legs 18 to minimize the footprint of the mobile base.

As is evident from the prior description of mobile base 22, stand 12 holds bars 30 and 82 in place relative to each other when the wheels and casters are lowered. In other words, mobile base 22 is designed so that the forces involved in the rotation of shafts 30 and 82 and in the lowering of wheels 52 and casters 86 are transmitted through and accommodated by stand 12. Using the stand to transmit those forces and hold bars 30 and 82 in place allows the mobile base to include a single link 70 between bars 30 and 82 instead of having different links connecting different ends of the shafts. When foot pedal 26 is pushed down and shafts 30 and 82 are rotated, arm 29 and link 70 at one end of the shafts creates a torque and, because the stand holds the shafts in place, that torque rotates the shafts instead of simply displacing them. Arms 50 and 80, discussed above, are sized as long as practical while still maintaining clearance to move as required, in order to minimize or lesson the force transmitted through the stand.

Once the wheels and casters are extended and positioned underneath the saw, they are locked in the extended position so that the operator is free to remove his foot from the foot pedal and move the saw without the wheels retracting. The mechanism that locks the wheels in the extended position includes a locking lever 110 shown isolated from other structures in FIG. 17. Locking lever 110 is a rigid, flat metal piece with a fold at one end. Locking lever 110 attaches to a tab 112 that extends up from the end of foot pedal arm 29 adjacent to where the arm attaches to bar 30, as shown in FIG. 18. The lever attaches to the tab by a shoulder screw 114 (similar to screw 76 discussed above) that passes through a hole 115 in the lever and then threads into a corresponding hole 116 in the tab. The locking lever is mounted to tab 112 about the flat section of shoulder screw 114 so that it can pivot around the screw. Thread adhesive is used to lock the threads of the shoulder screw in place so that it does not come out of tab 112 as the locking lever rotates. A washer 118 is placed between the tab and lever.

Figure 17:
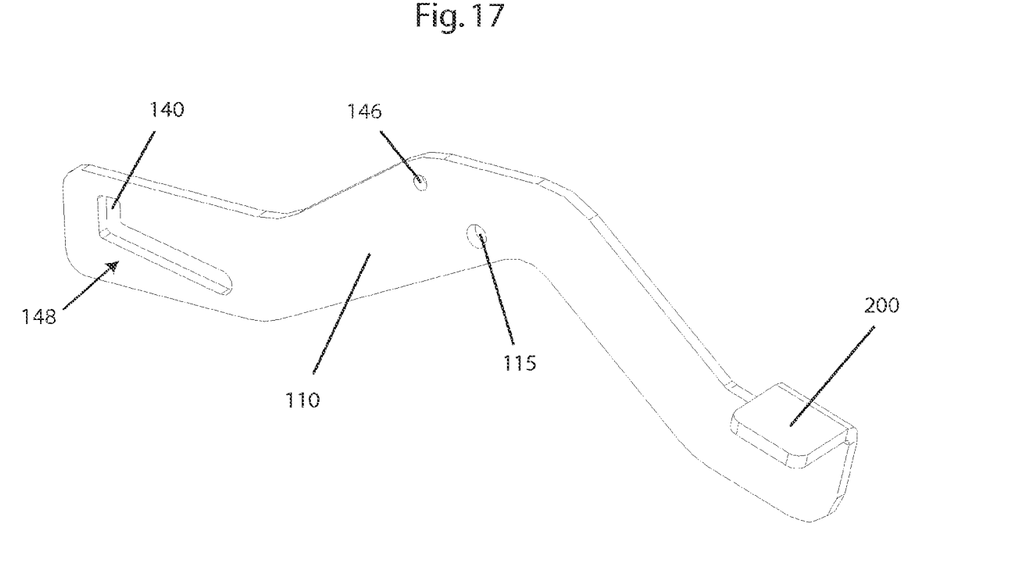
FIG. 17 shows an isolated view of a part in the mobile base called a locking lever.
Figure 18:
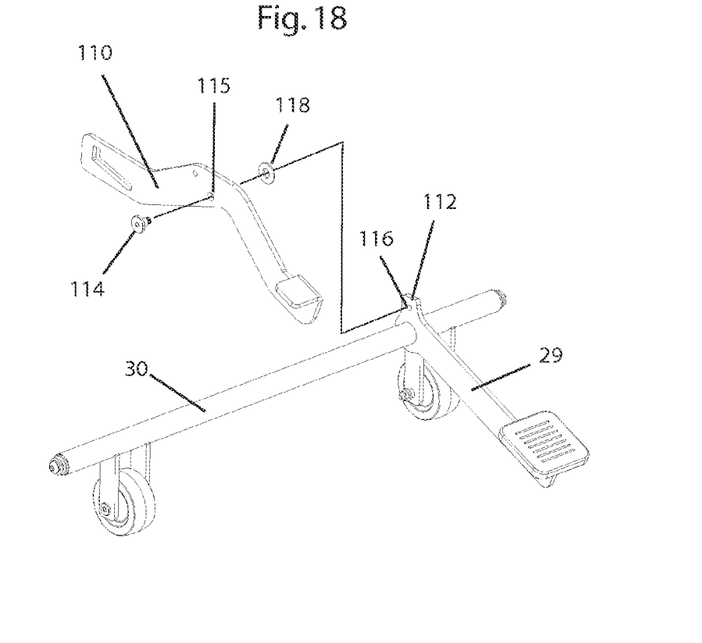
FIG. 18 shows how the locking lever of FIG. 17 attaches to the mobile base.

As seen in FIGS. 17 and 18, locking lever 110 has two ends and an arch or bend between the two ends. This allows the lever to arch up and over bar 30 so that it can attach to tab 112. Locking lever 110 attaches to link 70 by a bolt 120 shown in FIG. 19. Bolt 120 includes a threaded end 122 that threads into a hole 124 in link 70, and a nut 126 holds the bolt in place, as shown in FIG. 5. Locking lever 110 also includes a roughly L-shaped slot 148 in one end. Bolt 120 passes through slot 148 and the inside surface of the slot contacts a first smooth section 128 of bolt 120.

Figure 19:
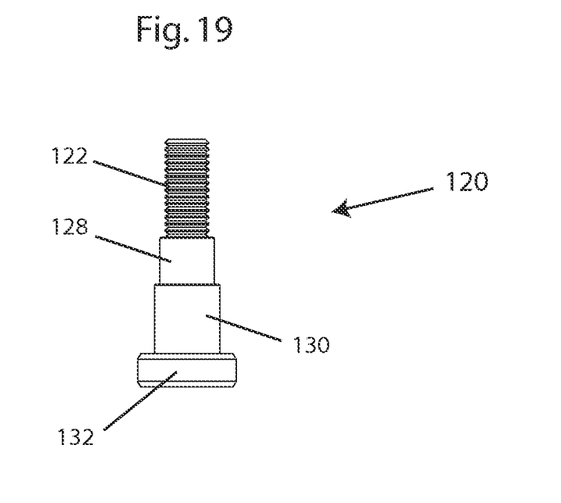
FIG. 19 shows a bolt used in the mobile base.
Figure 20:
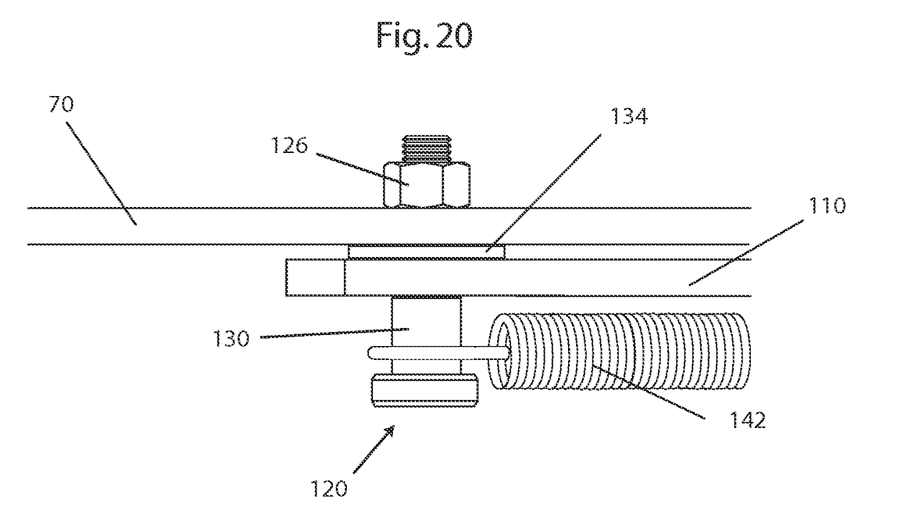
FIG. 20 shows the bolt of FIG. 19 installed in the mobile base.

As seen in FIG. 19, a second smooth section 130 of bolt 120 has a larger diameter than first section 128. The larger diameter of second section 130 is sized so that it is too large to fit through slot 148 of locking lever 110. This traps locking lever 110 within first section 128 and keeps the lever near to and parallel to link 70, as seen in FIG. 20. The shoulder between the first and second sections also provides an edge to abut the locking lever so that nut 126 can be tightened to hold the bolt in place. A washer 134 is positioned between locking lever 110 and link 70, as shown in FIG. 5.

Slot 148 is shaped so that locking lever 110 and link 70 can move relative to each other. As foot pedal 26 is pushed down, link 70 moves along locking lever 110 and bolt 120 slides in slot 148 toward the end of the slot furthest away from the foot pedal. The length of slot 148 is sized to limit how far bolt 120, and thus linkage 70, can move forward, thereby preventing over-rotation of bar 30 as pedal 26 is pushed down. If the wheel mounts of wheels 52 reach or go past a vertical position, the wheels may be pushed towards the inside of the stand as the saw is lowered which would render the foot pedal ineffective. Another safeguard against over-rotation, depending on the configuration of stand 12, is provided by lever arm 80 which might also abut a lower cross-rail of the stand and thereby be limited in how far it can move.

Figure 21:
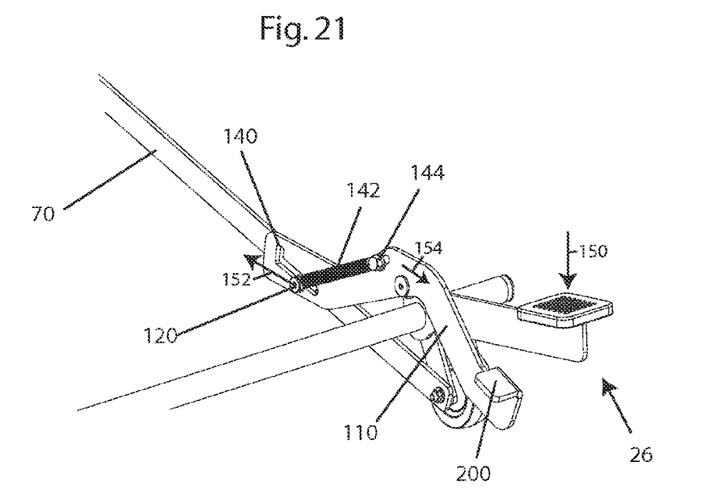
FIG. 21 shows the movement of the bolt of FIG. 19 in the mobile base.
Figure 22:
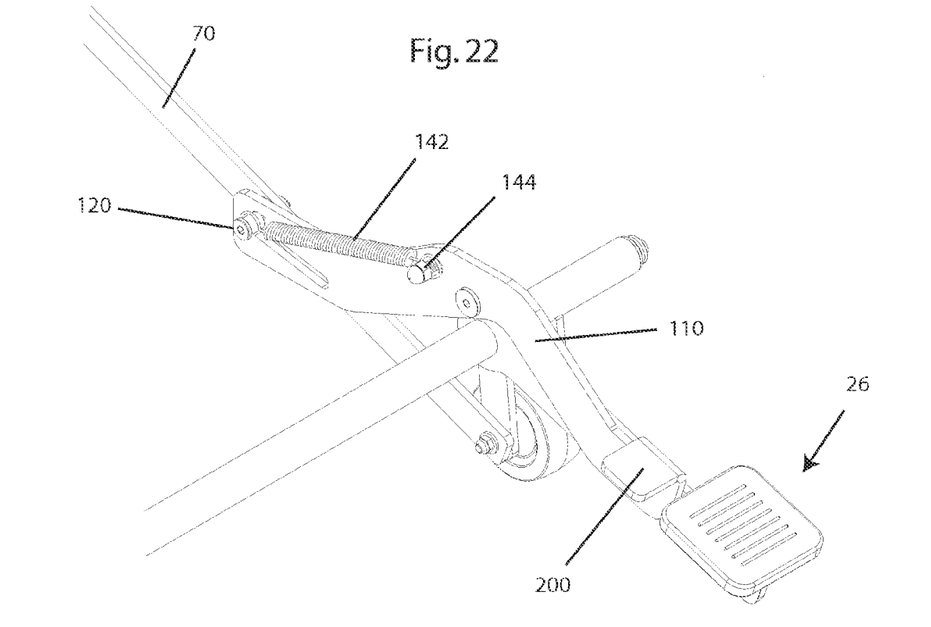
FIG. 22 shows the position of the bolt of FIG. 19 when the wheels are extended and locked.

As stated, slot 148 is roughly L-shaped and includes at its end an upturned section 140. As foot pedal 26 is pushed down, bolt 120 slides in slot 148 until the bolt is adjacent slot section 140. This is shown in FIGS. 21 and 22. Arrow 150 in FIG. 21 shows the foot pedal moving down and arrow 152 shows bolt 120 moving toward slot section 140.

A spring 142 is attached to bolt 120 and is also included in the locking mechanism. One end of the spring loops around section 130 of bolt 120 (as shown in FIG. 20) while the other end of the spring is placed around a threaded bolt 144 that is screwed into a hole 146 in locking lever 110. Bolt 120 includes a head 132 sized larger than section 130 to trap the end of the spring within section 130.

As link 70 moves, bolt 120 moves in one direction while locking lever 110 moves generally in the opposite direction, stretching spring 142. Arrow 154 in FIG. 21 shows the horizontal component of the movement of locking lever 110. When the spring is stretched it tries to pull bolts 120 and 144 together. Because bolt 120 is secured to link 70, it cannot be moved by spring 142 so the spring tries to pull bolt 144 downward. Slot 148 prevents that from happening as long as the top surface of the slot contacts bolt 120. However, when bolt 120 moves adjacent slot section 140, that section provides clearance for the spring to pivot locking lever 110 down so that bolt 120 moves into slot section 140. Bolt 120 is trapped in slot section 140 and spring 142 holds the bolt in that section. FIG. 22 shows bolt 120 in slot section 140.

Hole 146 of locking lever 110 is positioned between slot 148 and hole 115 and above hole 115 so that the force exerted by spring 142 causes lever 110 to rotate in such a way that bolt 120 moves into slot section 140. This traps bolt 120 in section 140, thereby locking the wheels in place even after the operator removes his foot from pedal 26.

Locking lever 110 also includes a foot pad 200 at the end opposite slot 148. Foot pad 200 allows the operator to release the wheels from their locked position. The wheels are released by pushing down on foot pad 200. That motion rotates slot 148 in locking lever 110 upward so that bolt 120 moves out of slot section 140 into the longer section of the slot. The weight of the saw then causes the saw to lower, and as the saw lowers, it pushes the wheels of the mobile base out of the way until the saw rests once again on the four feet 20 of stand 12.

The descent of the saw can be controlled by the operator's foot so that the saw descends smoothly to the ground. This is accomplished by the relative positions and sizes of foot pedal 26 and release foot pad 200. When in the unlocked position, foot pedal 26 is positioned above release pad 200, as shown in FIG. 21, so that the release pad is not likely to be pushed accidently. But in the locked position shown in FIG. 22, release pad 200 positioned only slightly above and adjacent pedal 26 so that the operator's foot can push down on release pad 200 to unlock the mechanism while also resting upon pedal 26 to control the rate of descent of the saw.

INDUSTRIAL APPLICABILITY

The mobile base and systems disclosed herein are applicable to wood-working power tool equipment, and particularly to table saws, including cabinet saws, contractor saws, hybrid saws, jobsite saws, and bench top saws. The described mobile base provides a simple and effective means for moving a piece of power equipment from one location to another.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A mobile base for use with a power tool having a stand with four legs, where the four legs are adapted to support the power tool during normal use of the power tool, where the legs of the stand extend from the power tool toward the ground, and where the distal ends of the legs relative to the power tool are configured to rest on the ground when the power tool is in use, the mobile base comprising:
   two rotatable shafts, each shaft configured to be held between two legs of the stand;
   a link extending between the two shafts, where the link is configured so that rotation of one shaft moves the link to rotate the other shaft;
   a moveable actuator adapted so that movement of the actuator rotates one shaft; and
   wheels attached to the shafts so that rotation of the shafts lowers the wheels;
   where the shafts are held by the legs of the stand so that the forces of rotating the shafts and lowering the wheels are transmitted through the stand; and
   where rotation of the shafts lowers the wheels in such a way to raise one side of the power tool asymmetrically compared to another side of the power tool.

2. The mobile base of claim 1 where the shafts and link are configured so that the shafts rotate in opposite directions when rotation of the shafts lowers the wheels.

3. The mobile base of claim 1 further comprising a locking mechanism to lock the wheels in a lowered position.

4. The mobile base of claim 3 where the locking mechanism is spring-biased.

5. The mobile base of claim 3 where the locking mechanism includes a release foot pad configured to allow an operator to release the wheels from the lowered position.

6. The mobile base of claim 5 where the actuator is a foot pedal, and where the foot pedal and release foot pad are positioned so that the release foot pad is above and adjacent the foot pedal when the wheels are in the lowered position.

7. The mobile base of claim 1 where the two rotatable shafts are substantially parallel, and where the link extends substantially transverse to the two shafts.

8. The mobile base of claim 7 where the two rotatable shafts have ends, and where the link is positioned closer to one set of ends than the other and inside the legs.

9. The mobile base of claim 1, where the legs of the stand slant outwardly and where the two rotatable shafts are held between the legs so that the shafts remain generally horizontal to the ground.

10. The mobile base of claim 9, where the legs of the stand include holes adapted to receive the ends of the two rotatable shafts.

11. The mobile base of claim 10, where each leg of the stand includes a surface that extends out from the leg, and where the hole in each leg adapted to receive an end of the two rotatable shafts is located in the surface.

* * * * *